United States Patent [19]

Esaki et al.

[11] Patent Number: 5,462,240
[45] Date of Patent: Oct. 31, 1995

[54] PHOTOGRAPHIC FILM CASSETTE AND METHOD OF ASSEMBLING THE PHOTOGRPAHIC FILM CASSETTE

[75] Inventors: Toshiro Esaki; Mituru Suzuki; Susumu Sato; Kohichi Takahashi; Makoto Shimizu, all of Kanagawa, Japan

[73] Assignee: Fuji Photo Film Co., Ltd., Kanagawa, Japan

[21] Appl. No.: 91,627

[22] Filed: Jul. 15, 1993

[30] Foreign Application Priority Data

Jul. 16, 1992 [JP] Japan .................................... 4-189731

[51] Int. Cl.⁶ ............................................... G03B 17/26
[52] U.S. Cl. ................................... 242/348.1; 242/587.1
[58] Field of Search ............................... 242/348, 348.1, 242/348.2, 348.3, 348.4, 582, 583, 584.1, 587.1; 354/275

[56] References Cited

U.S. PATENT DOCUMENTS

| | | | |
|---|---|---|---|
| 2,616,634 | 11/1952 | Melkon | 242/348.1 |
| 2,662,696 | 12/1953 | Nerwin | 242/348.1 |
| 2,719,679 | 10/1955 | Nerwin et al. | 242/348.1 |
| 3,003,712 | 10/1961 | Dalton | 242/582 |
| 3,640,480 | 2/1972 | Schleich | 242/563.2 X |
| 4,166,588 | 9/1979 | Krehbiel et al. | 242/348.1 |
| 4,733,777 | 3/1988 | Geyte et al. | 242/348.4 |
| 4,834,306 | 5/1989 | Robertson et al. | 242/348.3 |
| 4,955,555 | 9/1990 | Pierson et al. | 242/348.1 |

FOREIGN PATENT DOCUMENTS

| | | |
|---|---|---|
| 0135372 | 3/1986 | European Pat. Off. . |
| 0436767 | 7/1991 | European Pat. Off. . |
| 0442501 | 8/1991 | European Pat. Off. . |
| 52-77723 | 6/1977 | Japan . |
| 91/11383 | 8/1991 | WIPO . |

*Primary Examiner*—John M. Jillions
*Attorney, Agent, or Firm*—Sughrue, Mion, Zinn, Macpeak & Seas

[57] ABSTRACT

A photographic film cassette assembling method includes the steps of joining shell halves together by ultrasonic welding, to form a cassette shell, while accommodating a spool in the cassette shell. A film connection sheet is secured to the spool before the spool is mounted in the cassette shell. A free end of the film connection sheet is placed outside the cassette shell through a film passage mouth of the cassette shell. A strip of a photographic film is connected to the spool by attaching a trailing end of the photographic film to the free end of the film connection sheet and wound about the spool by rotating the spool. The photographic film may be directly secured to a spool having an engaging member formed therein and a film guide member formed integrally therewith. A free end or free ends of the guide member protrude slightly from the film passage mouth to the outside of the cassette shell. The trailing end of the photographic film is guided along the film guide member into the cassette shell toward the engaging member of the spool, thereby to bring the end of the photographic film into engagement with the engaging member.

10 Claims, 4 Drawing Sheets

PHOTOGRAPHIC FILM CASSETTE AND METHOD OF ASSEMBLING THE PHOTOGRPAHIC FILM CASSETTE

BACKGROUND OF THE INVENTION

1. Field of the Invention

The present invention relates to a photographic film cassette and a method of assembling the photographic film cassette. The present invention relates, more specifically to a photographic film cassette having a cassette shell made of resin material and a rotatable spool with a photographic film wound thereon wherein a leading end of the photographic film is advanced out of the cassette shell through a film passage mouth formed in the cassette shell by rotating the spool, and also to an assembling method of such a photographic film cassette.

2. Description of the Related Art

Recently, photographic film cassettes, wherein an entire photographic film is preliminarily contained within a plastic cassette shell in an unused state, have been proposed such as those disclosed in e.g., U.S. Pat. No. 4,834,306. The leading end of the photographic film is advanced out of the cassette shell by rotating the spool. In order to assemble such a photographic film cassette, the photographic film is first wound completely on the spool in a darkroom. Then the spool and film are accommodated between two cassette shell halves constituting the cassette shell. Thereafter, the shell halves made of a resin material are joined by ultrasonic welding.

Thus, the ultrasonic welding is operable to attach the plastic shell halves since plastic has a low degree of heat tolerance. However, during the ultrasonic welding, vibration is generated, due to the ultrasonic wave, which can cause the photographic film to be scratched due to contact with the cassette shell. Also, if an assembling machine malfunctions or requires maintenance, it is difficult to effect repair of the assembling machine in a darkroom compared with a lighted room. Accordingly, operation efficiency is low. If the darkroom is lighted for troubleshooting and repair, photographic films in the assembly line will be damaged.

SUMMARY OF THE INVENTION

In view of the foregoing, a primary object of the present invention is to provide a method of assembling a photographic film cassette wherein ineffective processes in the darkroom can be reduced.

Another object of the present invention is to provide a photographic film cassette which can be easily assembled.

To achieve the above and other objects, according to an assembling method of the present invention, shell halves are joined together, for example, by ultrasonic welding, to form a cassette shell, while accommodating a spool in the cassette shell and, thereafter, the cassette shell is transported to a darkroom, wherein a strip of photographic film is connected to the spool and wound about the spool by rotating the spool.

According to a preferred embodiment of the invention, a film connection sheet is secured to the spool and, thereafter, the spool is mounted in the cassette shell, while a free end of the film connection sheet is placed outside the cassette shell through a film passage mouth of the cassette shell. The photographic film is attached to the free end of the film connection and wound about the spool after assembling the cassette shell.

According to another embodiment, the photographic film is directly secured to a spool having an engaging member formed therein and a film guide member formed integrally therewith. The film guide member is constituted of a film guide sheet or a pair of guide strips. A free end or free ends of the guide member protrude slightly from the film passage mouth to the outside of the cassette shell. One end of the photographic film is guided along the film guide member into the cassette shell toward the engaging member of the spool, thereby to bring the end of the photographic film into engagement with the engaging member. Thereafter, the spool is rotated to wind the photographic film into the cassette shell after assembling the cassette shell.

In this way, processes that must be performed in the darkroom are reduced.

BRIEF DESCRIPTION OF THE DRAWINGS

The foregoing objects and advantages of this invention will become apparent to one skilled in the art from the following detailed description of the invention when read in conjunction with the accompanying drawings, in which.

DETAILED DESCRIPTION OF THE PREFERRED EMBODIMENTS

Figure 1:
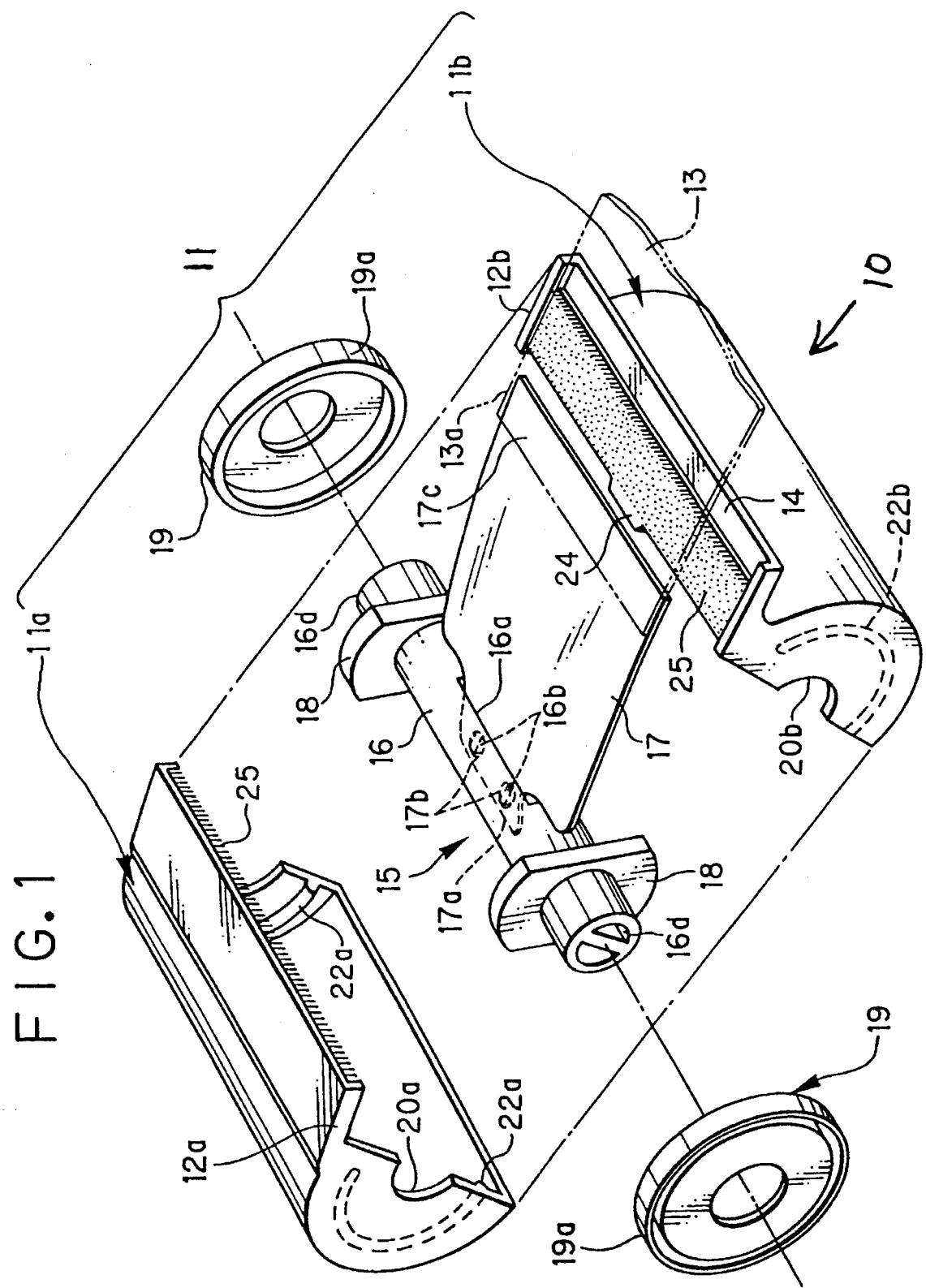
FIG. 1 is an exploded perspective view illustrating a photographic film cassette of a preferred embodiment according to the present invention.

Referring to FIG. 1, a photographic film cassette 10 has a cassette shell 11 consisting of upper and lower shell halves 11a and 11b which are attached by ultrasonic welding. The upper and lower shell halves 11a and 11b have integrally formed respective port portions 12a and 12b which are mated together to define a film passage mouth 14 of the cassette shell 11, through which a photographic film 13 passes in and out of the cassette shell 11.

A spool 15 having a core 16 and a pair of flanges 18 is provided in the cassette shell 11. The core 16 has a slit 16a formed therein and a pair of claws 16b extending into the slit 16a. A trailing end 17a of a leader sheet 17 is secured to the core 16 through engagement between the claws 16b and holes 17b formed in the trailing end 17a. A trailing end 13a of the photographic film 13 is attached to a free end 17c of the leader sheet 17. The leader sheet 17 is formed of e.g., polyethylene terephthalate (PET) and its length is predetermined such that the free end 17c of the leader sheet 17 slightly protrudes, e.g., about 15 mm, to the outside of the film passage mouth 14 when the shell halves 11a and 11b are jointed together after the spool 15 is accommodated therein. The flanges 18 are formed on both end portions of the core 16 and serve to prevent the photographic film 13 from loosening by confining the roll of photographic film in the lateral direction when the photographic film 13 is wound on the core 16. Further, flexible plastic disks 19 are rotatably fitted on the core 16 at axially outside portions relative to the flanges 18. The disks 19 are formed integrally with circumferential ridges 19*a*.

Lateral end surfaces of the upper and lower shell halves 11*a* and 11*b* are provided with semicircular cutouts 20*a* and 20*b* which form circular openings 20 for exposing end surfaces 16*d* of the core 16 to the outside when the upper and lower shell halves are joined together. Annular ridges 22*a* and 22*b* are formed on the lateral inside end surfaces of the upper and lower shell halves 11*a* and 11*b* to project inwardly to position the disks 19 such that they will not move in the axial direction of the spool 15. However, the ridges 22*a* and 22*b* are not formed in the vicinity of the port portions 12*a* and 12*b*. A separation claw 24 is formed on an innermost part of the port portion 12*b* of the lower shell half 11*b* to peel a leading end of the photographic film 13 off from the roll of photographic film 13 and to guide it toward the film passage mouth 14 as the spool 15 is rotated together with the photographic film 13. The inside surfaces of the port portions 12*a* and 12*b* have light-trapping pieces 25 attached thereto.

Figure 2:
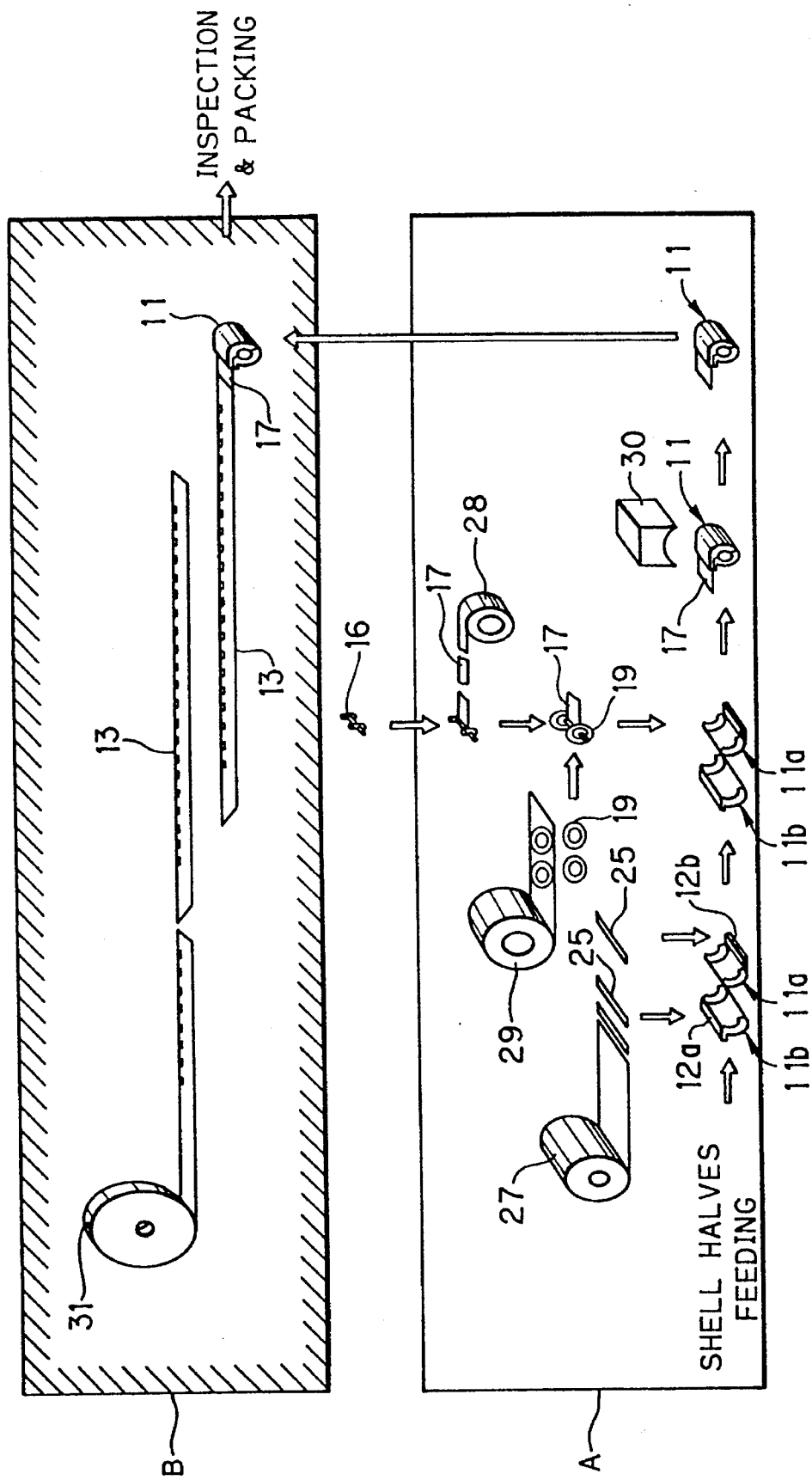
FIG. 2 is a schematical view illustrating an assembling system for assembling the photographic film unit in FIG. 1.

The assembly process of the photographic film cassette 10 will be described with reference to FIG. 2. In a lighted room, as indicated by Block A, the cassette shell halves 11*a* and 11*b* are first placed on an assembly line. Then, the light-trapping pieces 25 are cut from a long sheet of light-trapping material 27 wound in a roll, and attached to the port portions 12*a* and 12*b* of the cassette shell halves 11*a* and 11*b*. In the meantime, the leader sheet 17 is cut to the predetermined length from a continuous roll of leader sheet material 28, inserted in the slit 16*a*, and secured to the spool 15 via the claws 16*b* formed within the slit 16*a*. Next, the disks 19 are formed from a long sheet of disk material 29 wound in a roll, and freely mounted on the both end portions of the core 16. Then, after the spool 15 is put in between the shell halves 11*a* and 11*b* with the free end 17*c* of the leader sheet 17 being slightly projected from the film passage mouth 14, the shell halves 11*a* and 11*b* are mated to each other and securely attached by ultrasonic welding using an ultrasonic welding horn 30.

Thereafter, the cassette shell 11 with the leader sheet 17 projected from the film passage mouth 14 is transferred to a darkroom as indicated by Block B. At this time, the photographic film 13 is cut to a predetermined length from a long roll of photographic film 31. The trailing end 13*c* of the photographic film 13 is attached to the free end 17*c* of the leader sheet 17 projected from the film passage mouth 14 by e.g., a double-coated tape or an adhesive. Then, the entire length of the photographic film 13 is wound in the cassette shell 11 by rotation of the spool 15 resulting in completion of the photographic film cassette 10. Thereafter, the photographic film cassette 10 is again transferred to the lighted room, and subjected to inspection and packaging operations. Subsequently, the photographic film cassettes 10 are shipped to various places. It is to be noted that the leader sheet 17 may be formed integrally with the spool 15.

Figure 3:
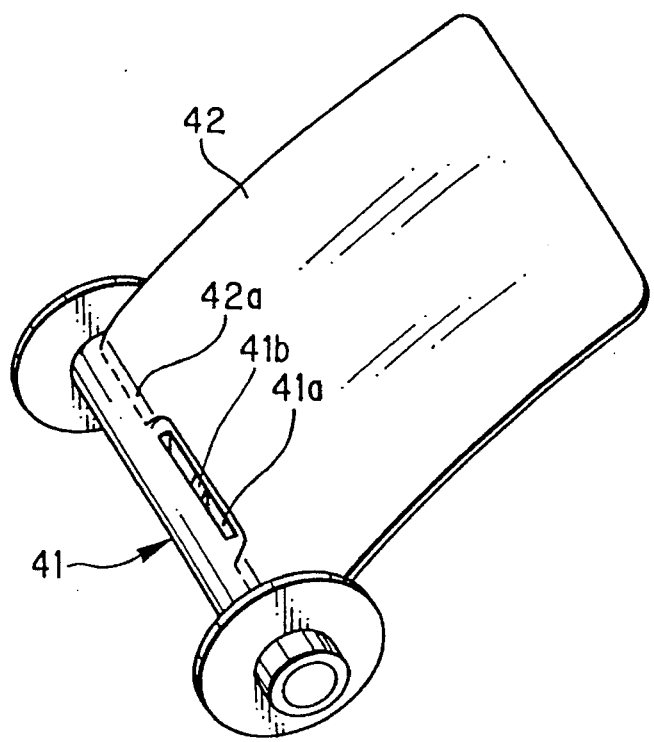
FIG. 3 is a perspective view illustrating a spool having a guide sheet.
Figure 4:
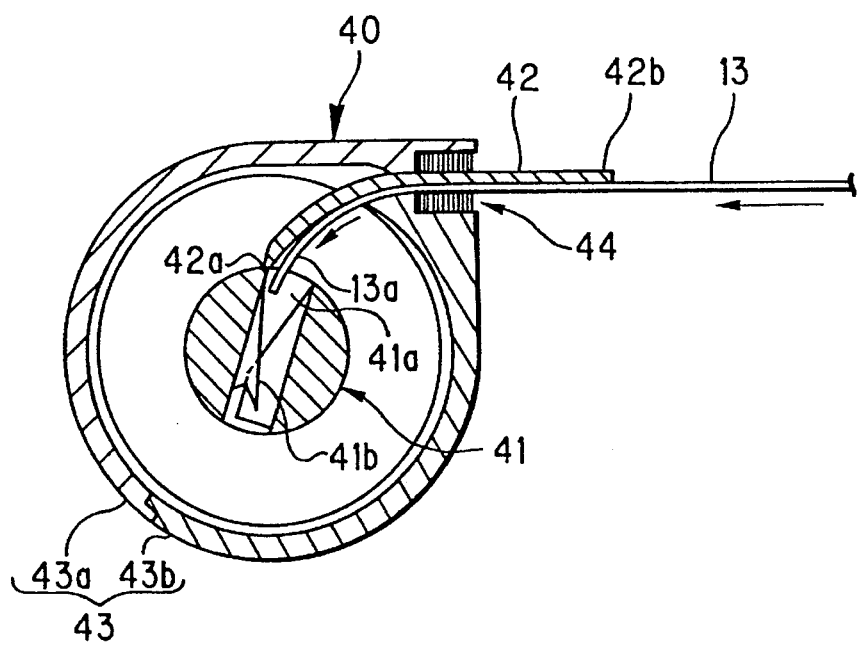
FIG. 4 is a cross section illustrating a process for attaching a photographic film to the spool in FIG. 3.

FIGS. 3 and 4 show a photographic film cassette 40 according to a second embodiment of the present invention, wherein a spool 41 has a guide sheet 42 integrally formed therewith. The guide sheet 42 serves to guide a trailing end 13*a* of a photographic film 13 into a slit 41*a* formed in the spool 41 and to secure it to the spool 41 by means of claws 41*b* formed to extend into the slit 41*a*. The width of the guide sheet 42 is approximately equal to that of the photographic film 13.

A border portion 42*a* of the guide sheet 42 on the spool 41 is formed thinner than the other portion of the guide sheet 42 so that the guide sheet 42 can be separated from the spool 41 when pulled with a strong force after the photographic film 13 has been secured to the spool 41.

The spool 41 is accommodated in a cassette shell 43 with the free end of the guide sheet 41*a* projected from a film passage mouth 44 to the outside of the cassette shell 11, when upper and lower shell halves 43*a* and 43*b* made of resin material are joined securely by ultrasonic welding to form the cassette shell 43 in the lighted room. Then, the cassette shell 43 is transferred to the darkroom, where the trailing end 13*a* of the photographic film 13 is inserted through the film passage mouth 44, guided into the slit 41*a* along the guide sheet 42 and arrested on the claws 41*b*. Thereafter, the guide sheet 42 is separated from the spool 41, by pulling thereon, and discarded. The photographic film 13 is then wound within the cassette shell 43 by rotation of the spool 41, resulting in completion of the photographic film cassette 40.

Figure 5:
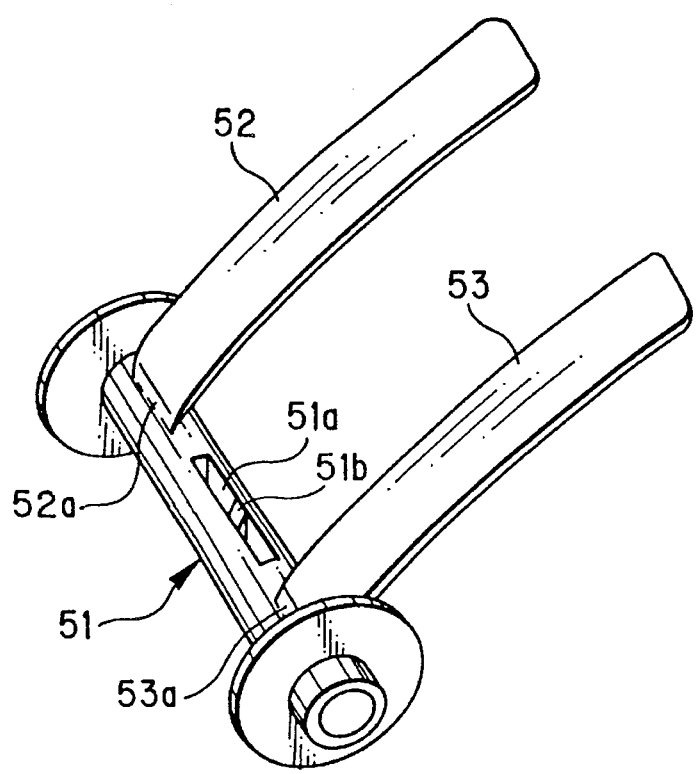
FIG. 5 is a perspective view illustrating a spool having guide strips.

FIG. 5 shows a spool 51 having a pair of guide strips 52 and 53 formed integrally therewith on opposite lateral sides of a slit 51*a* formed in the spool 51. This embodiment is an improvement of the spool 41 shown in FIG. 3, and is designed to conserve the spool material. The guide strips 52 and 53 can be easily torn off of the spool 51 along thin wall portions 52*a* and 52*a*. The spool 51 is accommodated in a cassette shell (not shown) with the free ends of the guide strips 52 and 53 projected from a film passage mouth at the time of assembly similar to the second embodiment. An end of a photographic film is inserted in the film passage mouth, guided into the slit 51*a* along the guide strips 52 and 53, and secured to the spool 51 by means of a claw 51*b* formed in the slit 51*a*. Thereafter, when the guide strips 52 and 53 are pulled, they are cut off from the spool 51 along the thin wall portions 52*a* and 53*a*.

Figure 6:
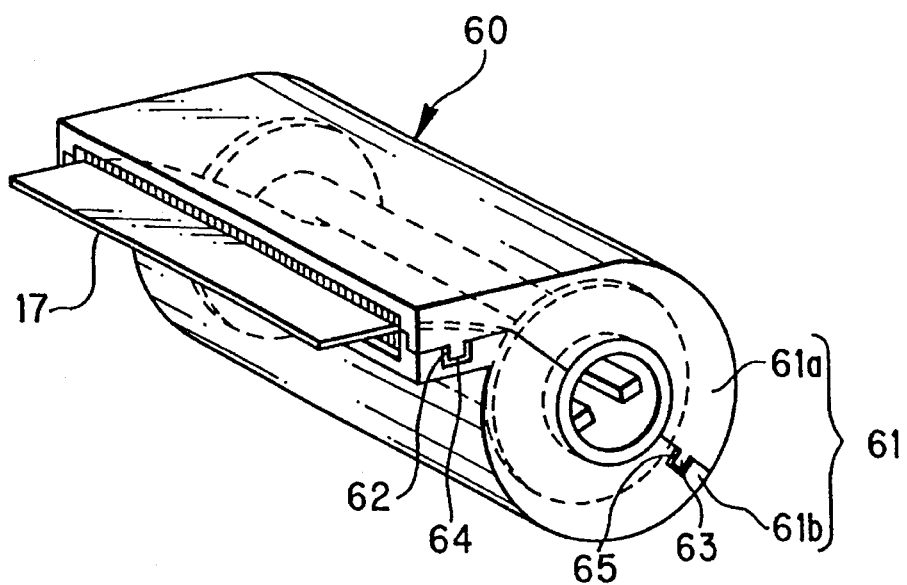
FIG. 6 is a perspective view illustrating a photographic film cassette whose cassette shell halves are fixedly engaged with each other before welding.

FIG. 6 shows another embodiment of a photographic film cassette 60, wherein upper and lower shell halves 61*a* and 61*b* constituting a cassette shell 61 is prevented from the displacement during the ultrasonic welding. The upper shell half 61*a* is provided with projections 62 and 63 while the lower shell half 61*b* is provided with cutouts 64 and 65 at portions thereof which correspond to the projections 62 and 63. In addition, the projections 62 and 63 have claws formed thereon while the cutouts 64 and 65 have corresponding recesses. Accordingly, the upper and lower shell halves 61*a* and 61*b* can be fixedly mated together by fitting the projections 62 and 63 in the respective cutouts 64 and 65.

The guide sheet or the guide strips are separated from the spool in the above-described embodiments, but these guide members may be wound in the cassette shell together with the photographic film. In this case, there is no need to provide the thin wall portions.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A method of assembling a photographic film cassette having a cassette shell comprising a pair of shell halves made of a resin material, a film passage mouth being defined between said shell halves, a spool mounted in said cassette shell in a rotatable manner, and a photographic filmstrip wound about said spool, said assembling method comprises the steps of:

A. mounting said spool between said shell halves;

B. joining said shell halves together to form said cassette shell;

C. connecting a trailing end of said photographic filmstrip to said spool after said joining step; and D. rotating said spool in a direction to wind said photographic filmstrip on said spool;

said spool being provided with film connection member which is constituted of an engaging member formed in said spool and a film guide member for guiding said trailing end of said photographic filmstrip into engagement with said engaging member, one end of said film guide member being secured to said spool and a free end of said film guide member extending outside said cassette shell through said film passage mouth in said mounting step A, and wherein said connecting step C comprises the step of inserting said trailing end of said photographic filmstrip into said film passage mouth toward said engaging member of said spool while sliding said trailing end of said photographic filmstrip along said film guide member, wherein said film guide member is formed integrally with said spool and has a thinned portion formed proximate said spool, and said method further comprises the step of pulling said film guide member to forcibly separate said film guide member from said spool, by tearing said thinned portion, after said connecting step C.

2. A method as recited in claim 1, wherein an entire length of said photographic filmstrip is wound into said cassette shell, and said cassette shell comprises means for guiding a leading end of said photographic filmstrip to an outside of said cassette shell through said film passage mouth in response to rotation of said spool in a direction to unwind said photographic filmstrip.

3. A method as recited in claim 2, wherein said joining step B comprises the steps of:

mating said shell halves together; and securing joints of said shell halves by ultrasonic welding after said mating step.

4. A method as recited in claim 3, wherein said shell halves are fixedly mated together through engagement therebetween.

5. A photographic film cassette as recited in claim 1, further comprising projections formed in one of said shell halves, and cutouts formed in the other of said shell halves in correspondence with said projections, said projections being fitted in said cutouts to provide a fixed engagement between said shell halves.

6. A photographic film cassette having a cassette shell comprising a pair of shell halves made of a resin material, a film passage mouth being defined between said shell halves, a spool mounted in said cassette shell in a rotatable manner, and a photographic filmstrip adapted to be wound about said spool, said photographic film cassette comprising:

a slit formed in said spool, said slit extending in an axial direction of said spool;

at least a claw formed on an inside surface of said slit for securing a trailing end of said photographic filmstrip to said spool by virtue of engagement between said claw and said filmstrip;

a film guide member formed integrally with said spool for guiding said trailing end of said photographic filmstrip into said slit, a free end of said film guide member extending outside of said cassette shell through said film passage mouth when said shell halves are joined together to form said cassette shell before said photographic filmstrip is secured to said spool and wound into said cassette shell by rotating said spool, said film guide member has a thinned portion formed proximate said spool so as to facilitate separating said film guide member from said spool.

7. A photographic film cassette as recited in claim 6, wherein an entire length of said photographic filmstrip is wound into said cassette shell, and said cassette comprises means for guiding said photographic filmstrip to an outside of said cassette shell during rotation of said spool in a direction to unwind said photographic filmstrip.

8. A photographic film cassette as recited in claim 6, wherein said film guide member is a sheet disposed along said slit.

9. A photographic film cassette as recited in claim 6, wherein said film guide member is a pair of strips disposed on opposite lateral sides of said slit.

10. A method for assembling a photographic film cassette having a cassette shell consisting of two plastic shell halves and a rotatable spool with a photographic film wound thereon, and means for guiding a leading end of said photographic film out of said cassette shell through a film passage mouth formed in said cassette shell in response to rotation of said spool, said method comprising the steps of:

providing a film guide member on said spool for guiding said photographic film to said spool, said film guide member having a thinned portion formed proximate said spool;

attaching said plastic shell halves after having contained said spool therebetween with a free end of said film guide means projecting from said film passage mouth to the outside of said cassette shell;

guiding a trailing end of said photographic film along said film guide member toward said spool through said film passage mouth;

connecting said trailing end of said photographic film to said spool through an engaging means formed in said spool;

separating said film guide member from said spool at said thinned portion; and winding said photographic film completely into said cassette shell by rotating said spool.

\* \* \* \* \*